United States Patent
Sun et al.

(10) Patent No.: US 11,211,018 B1
(45) Date of Patent: Dec. 28, 2021

(54) GRAYSCALE COMPENSATION METHOD AND APPARATUS OF DISPLAY DEVICE

(71) Applicant: Xianyang Caihong Optoelectronics Technology Co., Ltd, Xianyang (CN)

(72) Inventors: Lei Sun, Xianyang (CN); Yuyeh Chen, Xianyang (CN); Pan Fei Zhang, Xianyang (CN); Zheng Liu, Xianyang (CN)

(73) Assignee: XIANYANG CAIHONG OPTOELECTRONICS TECHNOLOGY CO., LTD, Xianyang (CN)

( * ) Notice: Subject to any disclaimer, the term of this patent is extended or adjusted under 35 U.S.C. 154(b) by 0 days.

(21) Appl. No.: 16/912,205

(22) Filed: Jun. 25, 2020

(51) Int. Cl.
  *G09G 3/36* (2006.01)
  *G02F 1/1333* (2006.01)
  *G02F 1/13357* (2006.01)

(52) U.S. Cl.
  CPC ....... *G09G 3/3607* (2013.01); *G02F 1/13338* (2013.01); *G02F 1/133611* (2013.01); *G02F 2203/30* (2013.01); *G09G 2300/0847* (2013.01); *G09G 2310/027* (2013.01)

(58) Field of Classification Search
  CPC ............ G02F 1/1338; G02F 1/133611; G06F 3/0416; H04N 9/04513
  See application file for complete search history.

(56) References Cited

U.S. PATENT DOCUMENTS

| | | | | |
|---|---|---|---|---|
| 10,163,408 B1* | 12/2018 | Chen | ............ | G09G 3/3406 |
| 10,311,801 B2* | 6/2019 | Otoi | ............ | G09G 3/3426 |
| 10,783,836 B2* | 9/2020 | Zhang | ............ | G09G 3/3426 |
| 2009/0184915 A1* | 7/2009 | Tsai | ............ | G09G 3/3406 345/102 |
| 2012/0268436 A1* | 10/2012 | Chang | ............ | G09G 3/34 345/207 |
| 2014/0168288 A1* | 6/2014 | Tusch | ............ | G09G 5/00 345/690 |
| 2014/0306943 A1* | 10/2014 | Kuo | ............ | G09G 3/3406 345/207 |
| 2015/0365621 A1* | 12/2015 | Zhang | ............ | G09G 5/005 348/791 |
| 2016/0148582 A1* | 5/2016 | Chung | ............ | G09G 3/3611 345/89 |

(Continued)

*Primary Examiner* — Fred Tzeng
(74) *Attorney, Agent, or Firm* — WPAT, PC

(57) ABSTRACT

A grayscale compensation method and apparatus are provided. The grayscale compensation method includes: performing a grayscale compensation data detection on a display panel to obtain a first grayscale compensation data; preforming a grayscale compensation data detection on a backlight module to obtain a second grayscale compensation data; performing a data fusion on the first grayscale compensation data and the second grayscale compensation data to obtain a third grayscale compensation data; and performing a grayscale compensation on the display panel according to the third grayscale compensation data. By calculating the grayscale compensation data of the display panel and the backlight module at the same time, display brightness of the display panel is more uniform. Moreover, before the data fusion, the first and second grayscale compensation data may be reduced in resolution, the data amount of fusion calculation is less and the calculation time and storage space are saved.

11 Claims, 2 Drawing Sheets

(56) References Cited

U.S. PATENT DOCUMENTS

| | | | |
|---|---|---|---|
| 2018/0204429 A1* | 7/2018 | Savage, Jr. | G08B 7/066 |
| 2019/0279580 A1* | 9/2019 | Noh | G06F 3/0416 |
| 2020/0126497 A1* | 4/2020 | Wang | H04N 9/04513 |
| 2021/0097948 A1* | 4/2021 | Kang | G09G 3/3607 |

* cited by examiner

GRAYSCALE COMPENSATION METHOD AND APPARATUS OF DISPLAY DEVICE

FIELD OF THE DISCLOSURE

The disclosure relates to the field of liquid crystal display technologies, and more particularly to a grayscale compensation method and a grayscale compensation apparatus of a display device.

BACKGROUND

Most existing liquid crystal displays are backlight liquid crystal displays, including a housing, a liquid crystal panel disposed in the housing, and a backlight module disposed in the housing. Generally, the liquid crystal panel is composed of a color filter (CF) substrate, a thin film transistor (TFT) array substrate and a liquid crystal layer filled between the two substrates, the working principle of the liquid crystal panel is to control the rotation of liquid crystal molecules in the liquid crystal layer by applying a driving voltage on the TFT array substrate and CF substrate, thereby controlling the amount of light output, and refracting the light of the backlight module to produce a picture.

After the production of the display panel is completed, due to the limitation of the manufacturing process, each display panel will have different degrees of brightness unevenness (grayscale mura). In order to compensate for the grayscale mura of the display panel, the related art will use a camera to photograph the display images of different gray levels of the display panel, and obtain a grayscale compensation data according to the difference between the brightness and darkness of the display images, after a timing controller (TCON IC) is powered on, it will first compensate the grayscale data to be displayed through the grayscale compensation data, then output the compensated grayscale data for screen display, thereby improving the brightness and darkness uniformity of the display panel.

However, most of the existing display panels are backlight liquid crystal displays, during normal display, the backlight module is required to provide a light source for the display panel to display the picture, and then the camera is used to capture the display picture of the display panel to obtain grayscale compensation data, if the backlight module itself has obvious differences in brightness and darkness, and if the brightness and darkness differences of the display panel are compensated only by the grayscale compensation data of the display panel, a new difference in brightness and darkness will be generated due to the difference in brightness and darkness of the backlight module.

SUMMARY

In view of the above issues in the related art, the disclosure provides a grayscale compensation method and a grayscale compensation apparatus of a display device.

Technical solutions of the disclosure are embodied as follows.

According to an aspect of the disclosure, a grayscale compensation method of a display device, includes:
performing a grayscale compensation data detection on a display panel to obtain a first grayscale compensation data;
performing a grayscale compensation data detection on a backlight module to obtain a second grayscale compensation data;
performing a data fusion on the first grayscale compensation data and the second grayscale compensation data to obtain a third grayscale compensation data; and
performing a grayscale compensation on the display panel according to the third grayscale compensation data.

According to an embodiment of the disclosure, performing a grayscale compensation data detection on a display panel to obtain a first grayscale compensation data includes:
inputting a first grayscale data corresponding to a first grayscale value to the display panel when the display panel is turned on to obtain a first initial display image of the display panel;
comparing the first initial display image with a first target display image to obtain a first grayscale error image;
reducing a resolution of the first grayscale error image to obtain a first low-resolution grayscale error image; and
calculating the first grayscale compensation data according to the first low-resolution grayscale error image.

According to an embodiment of the disclosure, performing a grayscale compensation data detection on a backlight module to obtain a second grayscale compensation data, includes:
obtaining a second initial display image of a test display panel illuminated by the backlight module;
comparing the second initial display image with a second target display image to obtain a second grayscale error image;
reducing a resolution of the second grayscale error image to obtain a second low-resolution grayscale error image; and
calculating the second grayscale compensation data according to the second low-resolution grayscale error image.

According to an embodiment of the disclosure, obtaining a second initial display image of a test display panel illuminated by the backlight module includes:
selecting a display panel of uniform brightness as the test display panel;
inputting s second grayscale data corresponding to a second grayscale value to the test display panel;
providing a light source for the test display panel by the backlight module; and
capturing a display image of the test display panel by a camera.

According to an embodiment of the disclosure, performing a data fusion on the first grayscale compensation data and the second grayscale compensation data to obtain a third grayscale compensation data, includes:
performing an addition operation onto each data point of the first grayscale compensation data and a data point at a corresponding location of the second grayscale compensation data to obtain the third grayscale compensation data.

According to an embodiment of the disclosure, after performing a data fusion on the first grayscale compensation data and the second grayscale compensation data to obtain a third grayscale compensation data, further includes:
performing an operation of increasing a resolution of the third grayscale compensation data to restore the third grayscale compensation data to an initial resolution.

According to another aspect of the disclosure, a grayscale compensation apparatus of a display device includes: a camera, a grayscale compensation data generation module, a grayscale compensation data fusion module and a compensation module; and
the camera is configured to capture a first initial display image reflecting a brightness of a display panel and a second initial display image reflecting a brightness of a backlight module individually;

the grayscale compensation data generation module is configured to compare the first initial display image with a corresponding first target display image to thereby obtain a first grayscale compensation data, and compare the second initial display image with a corresponding second target display image to thereby obtain a second grayscale compensation data;

the grayscale compensation data fusion module is configured to perform a data fusion on the first grayscale compensation data and the second grayscale compensation data to thereby obtain a third grayscale compensation data; and the compensation module is configured to perform a grayscale compensation on the display panel according to the third grayscale compensation data.

According to an embodiment of the disclosure, the grayscale compensation apparatus further includes a resolution adjustment module, connected to the grayscale compensation data generation module and the grayscale compensation data fusion module, and configured to reduce a resolution of the first grayscale compensation data and a resolution of the second grayscale compensation data before the data fusion, and increase a resolution of the third grayscale compensation data after the data fusion.

According to an embodiment of the disclosure, the grayscale compensation apparatus further includes a flash memory, connected to the grayscale compensation data fusion module and configured to store the third grayscale compensation data.

According to an embodiment of the disclosure, the grayscale compensation apparatus further includes a dynamic random access memory, connected to the flash memory and the compensation module, and configured to read the third grayscale compensation data when the display panel is powered on and transmit the third grayscale compensation data to the compensation module.

According to another aspect of the disclosure, a grayscale compensation apparatus of a display device, includes:

a camera, configured to capture a first initial display image reflecting a brightness of a display panel and a second initial display image reflecting a brightness of a backlight module individually;

one or more processors; and a memory in communication with the one or more processors and storing instructions that, when executed by the one or more processors, are configured to cause the grayscale compensation apparatus to: compare the first initial display image with a corresponding first target display image to thereby obtain a first grayscale compensation data, and compare the second initial display image with a corresponding second target display image to thereby obtain a second grayscale compensation data; perform a data fusion on the first grayscale compensation data and the second grayscale compensation data to thereby obtain a third grayscale compensation data; and perform a grayscale compensation on the display panel according to the third grayscale compensation data.

According to an embodiment of the disclosure, the instructions, when executed by the one or more processors, are configured to further cause the grayscale compensation apparatus to: reduce a resolution of the first grayscale compensation data and a resolution of the second grayscale compensation data before the data fusion, and increase a resolution of the third grayscale compensation data after the data fusion.

Compared with the related art, the beneficial effects of the disclosure are:

1. The grayscale compensation method and apparatus of the disclosure first obtain the first grayscale compensation data of the display panel, then obtain the second grayscale compensation data of the backlight module, and then perform a data fusion on the first grayscale compensation data and the second grayscale compensation data to obtain the third grayscale compensation data, and perform grayscale compensation on the display panel according to the third grayscale compensation data. By simultaneously calculating the grayscale compensation data of the display panel and the backlight module, the display, brightness of the display panel is more uniform.

2. The grayscale compensation method of the display device of the disclosure performs a resolution reduction operation on the first grayscale compensation data and the second grayscale compensation data before data fusion, the data amount of fusion calculation is less, and the calculation time and the storage space are saved.

The above description is only an overview of the technical solution of the disclosure. In order to understand the technical means of the disclosure more clearly, it can be implemented according to the content of the specification, and in order to make the above and other objects, features and advantages of the disclosure more comprehensible, preferred embodiments are described below in conjunction with the drawings, which are described in detail below.

DETAILED DESCRIPTION OF EMBODIMENTS

In order to further illustrate the technical means and effects adopted by the disclosure to achieve the intended purpose of the disclosure, the display panel and the display device according to the disclosure will be described in detail in conjunction with the accompanying drawings and specific embodiments.

The foregoing and other technical contents, features, and effects of the disclosure can be clearly presented in the following detailed description of the specific embodiments in conjunction with the drawings. Through the description of the specific embodiments, the technical means and effects adopted by the disclosure to achieve the intended purpose can be understood more deeply and specifically, however, the attached drawings are provided for reference and explanation only, and are not intended to limit the technical solutions of the disclosure.

First Embodiment

Figure 1:
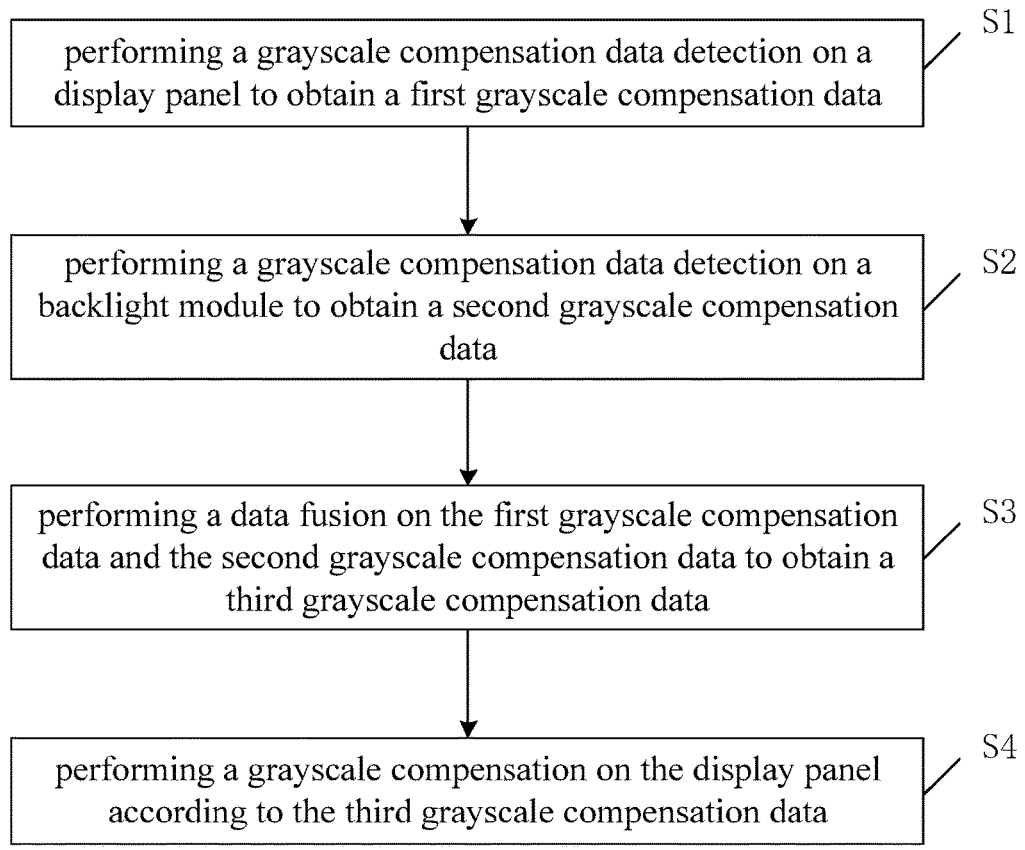
FIG. 1 is a flowchart of a grayscale compensation method of a display device according to an embodiment of the disclosure.

Please Refer to FIG. 1 together, FIG. 1 is flowchart of a grayscale compensation method of a display device according to an embodiment of the disclosure. The grayscale compensation method of the display device includes:

S1, performing a grayscale compensation data detection on a display panel to obtain a first grayscale compensation data;

S2, performing a grayscale compensation data detection on a backlight module to obtain a second grayscale compensation data;

S3, performing a data fusion on the first grayscale compensation data and the second grayscale compensation data to obtain a third grayscale compensation data; and S4, performing a grayscale compensation on the display panel according to the third grayscale compensation data.

Figure 2:
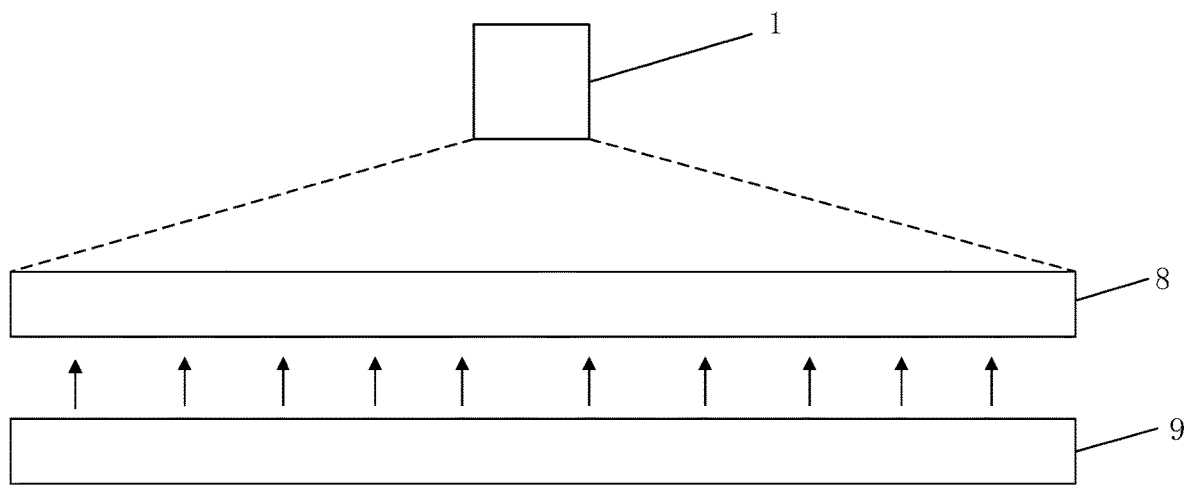
FIG. 2 is a schematic diagram associated with a step 11 of the grayscale compensation method of the display device according to the embodiment of the disclosure.

Further, the S1 includes:

S11, obtaining a first initial display image of the display panel;

Specifically, please refer to FIG. 2, which is a schematic diagram of step S11 of the grayscale compensation method of the display device according to the embodiment of the disclosure. Input a first grayscale data corresponding to a first grayscale value to the display panel 8 to be tested; provide the display panel 8 with a light source through the test backlight light source 9 so that the display panel 8 is turned on; use a camera 1 to capture the first initial display image of the display panel 8 on the side opposite to the test backlight light source 9 of the display panel 8.

In this embodiment, preferably, the first grayscale value is 255, and at this time, the display panel to be tested is in the brightest state. The test backlight source is an ideal backlight source for testing the initial display image of the display panel. In this embodiment, a backlight light source with brightness uniformity greater than 95% is preferably selected as the backlight light source for testing, that is, the ratio of the brightness in the darkest place to the brightness in the brightest place is greater than 95%.

S12, comparing the first initial display image with a first target display image to obtain a first grayscale error image (may also be referred to as first grayscale difference image);

Specifically, when the first grayscale data (225 grayscales in this embodiment) is input to the display panel, the ideal display image of the display panel when the brightness uniformity is 100% is the first target display image.

S13, reducing a resolution of the first grayscale error image to obtain a first low-resolution grayscale error image;

In order to shorten the subsequent calculation time and reduce the storage area, the first grayscale error image is sampled with reduced resolution. For example, in this embodiment, the resolution of the initial display image of the display panel is 3840*2160, and the resolution of the first grayscale error image obtained through S12 is also 3840*2160. Then, when the resolution is reduced, 3840*2160 pixels of the first grayscale error image are sampled every 8 points along the vertical and horizontal directions, to obtain the first low-resolution grayscale error image with 481*271 pixels, thereby reducing the resolution of the first grayscale error image.

S14, calculating the first grayscale compensation data according to the first low-resolution grayscale error image.

Figure 3:
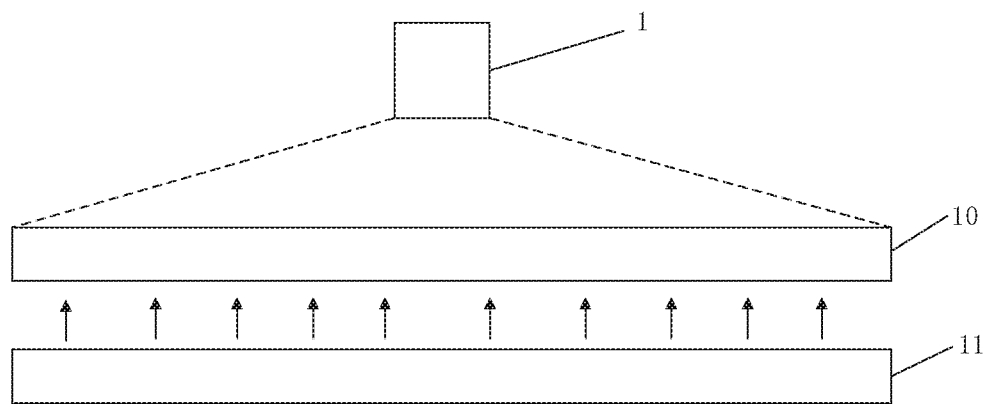
FIG. 3 is a schematic diagram associated with a step 21 of the grayscale compensation method of the display device according to the embodiment of the disclosure.

Further, the S2 includes:

S21, obtaining a second initial display image of a test display panel illuminated by the backlight module;

Specifically, please refer to FIG. 3, which is a schematic diagram of step S21 of the grayscale compensation method of the display device according to the embodiment of the disclosure, selecting a display panel of uniform brightness as the test display panel 10; inputting s second grayscale data corresponding to a second grayscale value to the test display panel 10; providing a light source for the test display panel 10 by the backlight module 11; and capturing a display image of the test display panel by a camera 1, thus the image that reflects the brightness uniformity of the backlight module 11 is obtained. The direction of the arrows in FIG. 2 and FIG. 3 is the direction of illumination.

In this embodiment, preferably, the second grayscale value is 255, and at this time, the test display panel 10 is in the brightest state. The test display panel 10 is an ideal panel for testing the brightness uniformity of the backlight module, in this embodiment, the display panel with brightness uniformity greater than 95% is preferably used as the test display panel, that is, the ratio of the brightness in the darkest place to the brightness in the brightest place is greater than 95%.

S22, comparing the second initial display image with a second target display image to obtain a second grayscale error image (may also be referred to as second grayscale difference image);

In this embodiment, assuming that the brightness uniformity of the backlight module 11 is 100%, the ideal display image of the test display panel 10 in the brightest state is the second target display image.

S23, reducing a resolution of the second grayscale error image to obtain a second low-resolution grayscale error image;

As described above, after the first grayscale error image is obtained, a resolution reduction operation is performed on the first grayscale error image; similarly, in this embodiment the second grayscale error image is also sampled with reduced resolution. For example, in this embodiment, the resolution of the display image of the test display panel is 3840*2160, and the resolution of the second grayscale error image obtained through S22 is also 3840*2160. Then, when the resolution is reduced, in order to facilitate the subsequent fusion operation of the first grayscale compensation data and the second grayscale compensation data, 3840*2160 pixels of the second grayscale error image are also sampled every 8 points along the vertical and horizontal directions, to obtain the second low-resolution grayscale error image with 481*271 pixels, thereby reducing the resolution of the second grayscale error image.

S24, calculating the second grayscale compensation data according to the second low resolution grayscale error image.

In this embodiment, the S3 includes:

performing an addition operation onto each data point of the first grayscale compensation data and a data point at a corresponding location of the second grayscale compensation data to obtain the third grayscale compensation data.

Specifically, the data of 481*271 points in the first grayscale compensation data is sequentially added correspondingly to the data of 481*271 points in the second grayscale compensation data to obtain the third grayscale compensation data representing 481*271 points. According to the above calculation formula and description, the third grayscale compensation data obtained at this time can simultaneously reflect the brightness uniformity of the display panel and the backlight module used with the display panel.

In this embodiment, after the S3, further includes:

performing an operation to of increasing a resolution of the third grayscale compensation data to restore the third grayscale compensation data to an initial resolution.

Since the resolution of the image corresponding to the third grayscale compensation data at this time is 481*271, and the resolution of the liquid crystal panel is 3840*2160, before performing grayscale compensation on the display panel, first, the third grayscale compensation data is calculated to increase the resolution, so that the resolution of the third grayscale compensation data is increased to 3840*2160.

Subsequently, the display panel is performed grayscale compensation according to the third grayscale compensation data, so that the display panel can display the grayscale-compensated image to improve the display brightness uniformity of the display panel.

The grayscale compensation method of the display device of the embodiment first obtain the first grayscale compensation data of the display panel, then obtain the second grayscale compensation data of the backlight module, and then perform a data fusion on the first grayscale compensation data and the second grayscale compensation data to obtain the third grayscale compensation data, and perform grayscale compensation on the display panel according to the third grayscale compensation data. By simultaneously calculating the grayscale compensation data of the display panel and the backlight module, the display brightness of the display panel is more uniform. In addition, the grayscale compensation method performs the resolution reduction operation on the first grayscale compensation data and the second grayscale compensation data before data fusion, the data amount of fusion calculation is less, and the calculation time and the storage space are saved.

Second Embodiment

Figure 4:
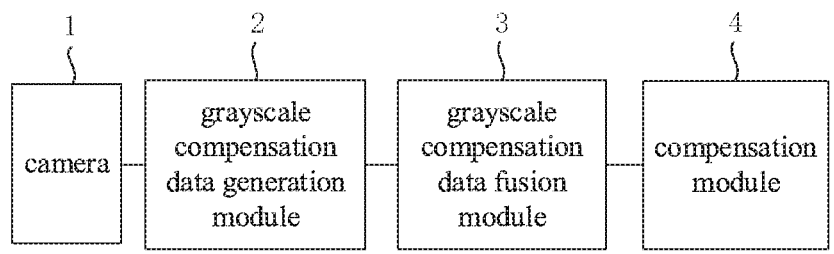
FIG. 4 is a schematic diagram of a grayscale compensation apparatus of a display, device according to an embodiment of the disclosure.

On the basis of the foregoing embodiments, this embodiment provides a grayscale compensation apparatus of a display device. Please refer to FIG. 4; FIG. 4 is a simple schematic diagram of the grayscale compensation apparatus of the display device according to the embodiment of the disclosure. The grayscale compensation apparatus of the display device of this embodiment includes a camera 1, a grayscale compensation data generation module 2, a grayscale compensation data fusion module 3, and a compensation module 4. The camera 1 is configured to capture a first initial display image reflecting a brightness of a display panel and a second initial display image reflecting a brightness of a backlight module individually. The grayscale compensation data generation module 2 is configured to compare the first initial display image with a corresponding first target display image to thereby obtain a first grayscale compensation data, and compare the second initial display image with a corresponding second target display image to thereby obtain a second grayscale compensation data. The grayscale compensation data fusion module 3 is configured to perform a data fusion on the first grayscale compensation data and the second grayscale compensation data to thereby obtain a third grayscale compensation data. The compensation module 4 is configured to perform grayscale compensation on the display panel according to the third grayscale compensation data.

Figure 5:
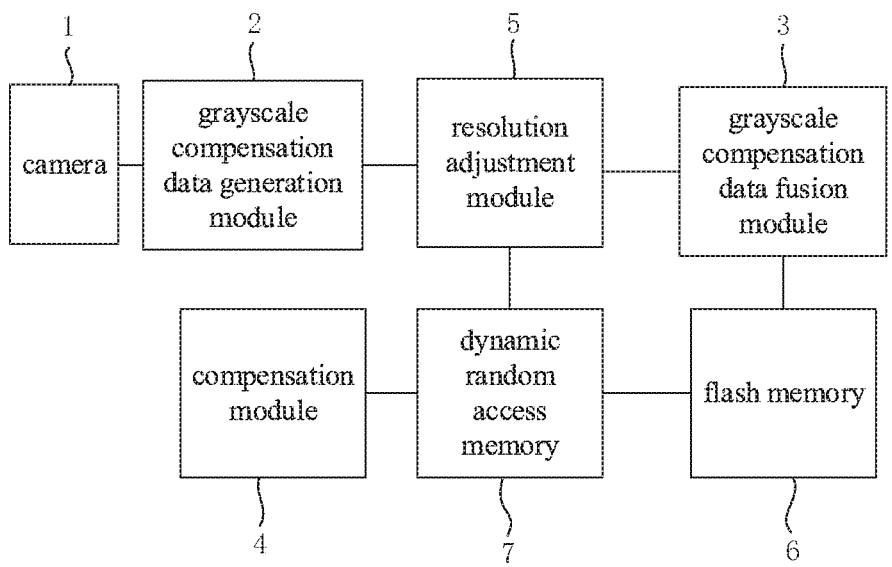
FIG. 5 is a specific schematic diagram of the grayscale compensation apparatus of the display device according to the embodiment of the disclosure.

Further, please refer to FIG. 5; FIG. 5 is a detailed schematic diagram of the grayscale compensation apparatus of the display device according to the embodiment of the disclosure. As shown in FIG. 5, the grayscale compensation apparatus further includes a resolution adjustment module 5. The resolution adjustment module 5 is connected to the grayscale compensation data generation module 2 and the grayscale compensation data fusion module 3. The resolution adjustment module 5 is configured to reduce a resolution of the first grayscale compensation data and a resolution of the second grayscale compensation data before the data fusion, and increase a resolution of the third grayscale compensation data after the data fusion.

In addition, the grayscale compensation apparatus further includes a flash memory 6. The flash memory 6 is connected to the grayscale compensation data fusion module 3. The flash memory 6 is configured to store the third grayscale compensation data. Specifically, after the first grayscale compensation data and the second gray scale compensation data are fused and the third grayscale compensation data is obtained, the third grayscale compensation data is stored in the flash memory 6 for subsequent use.

The grayscale compensation apparatus further includes a dynamic random access memory 7. The dynamic random access memory 7 is connected to the flash memory 6 and the compensation module 4. The dynamic random access memory 7 is configured to read the third grayscale compensation data when the display panel is powered on and transmit the third grayscale compensation data to the compensation module 4. Specifically, after the display panel is powered on, that is, after the display panel is applied with an operating voltage, the dynamic random access memory 7 reads the third grayscale compensation data from the flash memory 6 and transmits the third grayscale compensation data to the compensation module 4, subsequently, the compensation module 4 performs grayscale compensation on the display panel according to the third grayscale compensation data, so that the display panel is with uniform display brightness.

In this embodiment, the camera 1 is a CCD camera, and the dynamic random access memory 7 is DDR (double data rate dynamic random access memory).

It is worth mentioning that the grayscale compensation data generation module 2, the grayscale compensation data fusion module 3, the compensation module 4 and the resolution adjustment module 5 are, for example, instructions stored in a non-volatile memory and executable by one or more processors to perform the above steps S1-S4. The camera 1, the flash memory 6 and the dynamic random access memory 7 are all connected to the one or more processors, for example, and the instructions may be stored in the flash memory 6 or other non-volatile memory.

The above is detailed description of the disclosure in combination with specific preferred embodiments, and it cannot be assumed that the specific implementations of the disclosure are limited to these descriptions. For the person of ordinary skill in the technical field to which the disclosure belongs, without deviating from the concept of the disclosure, several simple deductions or replacements can be made, which should be regarded as falling within the protection scope of the disclosure.

What is claimed is:

1. A grayscale compensation method of a display device, comprising:
    performing a grayscale compensation data detection on a display panel to obtain a first grayscale compensation data;
    performing a grayscale compensation data detection on a backlight module to obtain a second grayscale compensation data;
    performing a data fusion on the first grayscale compensation data and the second grayscale compensation data to obtain a third grayscale compensation data; and
    performing a grayscale compensation on the display panel according to the third grayscale compensation data;
    wherein performing a grayscale compensation data detection on a display panel to obtain a first grayscale compensation data, comprises:

inputting a first grayscale data corresponding to a first grayscale value to the display panel when the display panel is turned on to obtain a first initial display image of the display panel;

comparing the first initial display image with a first target display image to obtain a first grayscale error image;

reducing a resolution of the first grayscale error image to obtain a first low-resolution grayscale error image; and calculating the first grayscale compensation data according to the first low-resolution grayscale error image.

2. The grayscale compensation method as claimed in claim 1, wherein performing a grayscale compensation data detection on a backlight module to obtain a second grayscale compensation data, comprises:

obtaining a second initial display image of a test display panel illuminated by the backlight module;

comparing the second initial display image with a second target display image to obtain a second grayscale error image;

reducing a resolution of the second grayscale error image to obtain a second low-resolution grayscale error image; and calculating the second grayscale compensation data according to the second low-resolution grayscale error image.

3. The grayscale compensation method as claimed in claim 2, wherein obtaining a second initial display image of a test display panel illuminated by the backlight module, comprises:

selecting a display panel of uniform brightness as the test display panel;

inputting a second grayscale data corresponding to a second grayscale value to the test display panel;

providing a light source for the test display panel by the backlight module; and capturing a display image of the test display panel by a camera.

4. The grayscale compensation method as claimed in claim 3, after performing a data fusion on the first grayscale compensation data and the second grayscale compensation data to obtain a third grayscale compensation data, further comprising, performing an operation of increasing a resolution of the third grayscale compensation data to restore the third grayscale compensation data to an initial resolution.

5. The grayscale compensation method as claimed in claim 1, wherein performing a data fusion on the first grayscale compensation data and the second grayscale compensation data to obtain a third grayscale compensation data, comprises:

performing an addition operation onto each data point of the first grayscale compensation data and a data point at a corresponding location of the second grayscale compensation data to obtain the third grayscale compensation data.

6. A grayscale compensation apparatus of a display device, comprising: a camera (1), a grayscale compensation data generation module (2), a grayscale compensation data fusion module (3) and a compensation module (4); wherein, the camera (1) is configured to capture a first initial display image reflecting a brightness of a display panel and a second initial display image reflecting a brightness of a backlight module individually;

the grayscale compensation data generation module (2) is configured to compare the first initial display image with a corresponding first target display image to thereby obtain a first grayscale compensation data, and compare the second initial display image with a corresponding second target display image to thereby obtain a second grayscale compensation data;

the grayscale compensation data fusion module (3) is configured to perform a data fusion on the first grayscale compensation data and the second grayscale compensation data to thereby obtain a third grayscale compensation data; and the compensation module (4) is configured to perform a grayscale compensation on the display panel according to the third grayscale compensation data.

7. The grayscale compensation apparatus as claimed in claim 6, further comprising:

a resolution adjustment module (5), connected to the grayscale compensation data generation module (2) and the grayscale compensation data fusion module (3), and configured to reduce a resolution of the first grayscale compensation data and a resolution of the second grayscale compensation data before the data fusion and increase a resolution of the third grayscale compensation data after the data fusion.

8. The grayscale compensation apparatus as claimed in claim 7, further comprising:

a flash memory (6), connected to the grayscale compensation data fusion module (3) and configured to store the third grayscale compensation data.

9. The grayscale compensation apparatus as claimed in claim 8, further comprising:

a dynamic random access memory (7), connected to the flash memory (6) and the compensation module (4), and configured to read the third grayscale compensation data when the display panel is powered on and transmit the third grayscale compensation data to the compensation module (4).

10. A grayscale compensation apparatus of a display device, comprising:

a camera, configured to capture a first initial display image reflecting a brightness of a display panel and a second initial display image reflecting a brightness of a backlight module individually;

one or more processors; and a memory in communication with the one or more processors and storing instructions that, when executed by the one or more processors, are configured to cause the grayscale compensation apparatus to:

compare the first initial display image with a corresponding first target display image to thereby obtain a first grayscale compensation data, and compare the second initial display image with a corresponding second target display image to thereby obtain a second grayscale compensation data;

perform a data fusion on the first grayscale compensation data and the second grayscale compensation data to thereby obtain a third grayscale compensation data; and perform a grayscale compensation on the display panel according to the third grayscale compensation data.

11. The grayscale compensation apparatus as claimed in claim 10, wherein the instructions, when executed by the one or more processors, are configured to further cause the grayscale compensation apparatus to:

reduce a resolution of the first grayscale compensation data and a resolution of the second grayscale compensation data before the data fusion, and increase a resolution of the third grayscale compensation data after the data fusion.

\* \* \* \* \*